March 28, 1967     T. K. ZEVELY     3,310,854
AUTOMATIC HEIGHT CONTROL MEANS FOR BLOCK MOLDING MACHINES
Filed Aug. 28, 1964     2 Sheets-Sheet 1

INVENTOR
THOMAS K. ZEVELY
BY
Cameron, Kerkam & Sutton
ATTORNEYS

March 28, 1967  T. K. ZEVELY  3,310,854
AUTOMATIC HEIGHT CONTROL MEANS FOR BLOCK MOLDING MACHINES
Filed Aug. 28, 1964  2 Sheets-Sheet 2

INVENTOR
THOMAS K. ZEVELY
BY Cameron, Kerkam & Sutton
ATTORNEYS

United States Patent Office 3,310,854
Patented Mar. 28, 1967

3,310,854
AUTOMATIC HEIGHT CONTROL MEANS FOR
BLOCK MOLDING MACHINES
Thomas K. Zevely, 5826 Swarthmore Drive,
College Park, Md. 20740
Filed Aug. 28, 1964, Ser. No. 392,709
5 Claims. (Cl. 25—45)

This invention relates to control means for block molding machines of the type adapted to automatically produce building blocks of cinder, slag, concrete or similar materials, and is directed primarily to an improved means for insuring uniform, accurately predetermined heights of blocks irrespective of the thickness of the pallets upon which the blocks are formed.

Some types of block forming machines now commonly in use, such as that disclosed in my earlier U.S. Patent No. 2,686,950, include the use of a sliding aggregate-mix feed box which is movable between a mix-receiving position and a mix-discharging position over a mold box which is open at its top and bottom sides. In these machines, imperforate pallets, upon which the blocks are supported during the molding operation, are moved in timed succession into association with the bottom of the mold box to close the latter by a well known pallet conveying and supporting system. Usually part of the molding operation occurs after the feed box is moved away from the mold box and during which a pressure applying stripper head is moved downwardly into aligned association with the upper side of the mold box where it rests freely upon the aggregate mix therein.

The mold box of these known block forming machines is supported by transverse mold bars which in turn normally rest upon stationary arms of the machine frame, and is subsequently vibrated by suitable means during the molding operation. However, prior to and during the vibrating thereof, the mold box and pallet therebeneath are elevated slightly by a pallet supporting frame so that they and the mold bars are out of engagement with the stationary arms of the machine framework. This vibration, which causes the mix to settle in the mold box on the pallet, may continue for a fraction of a second to relieve any stress on the block after the height control means is activated, but does not continue during the stripping operation when a stripper head, supported by the downwardly movable frame, freely follows and contacts the mix during its movement downward relative to the supported mold box, and strips or ejects the blocks from the mold box shortly after the vibration is interrupted. By means of suitable positive mechanical connections between the stripper head frame and the pallet supporting frame, the latter moves downward simultaneously with the stripper head while the formed blocks are held between the pallet and the stripper head, after which the blocks on the pallet are advanced to unloading and curing stations.

The aforementioned positive mechanical connections usually comprise a pair of adjustable height control rods which depend from the stripper frame on opposite sides of the mold box, and gradually move down into engagement with a pair of complemental aligned upstanding height control rods affixed to the pallet supporting frame as the stripper frame settles downwardly during the molding and vibrating operations. When the pairs of height control rods make contact, this establishes or fixes the height of the blocks in accordance with the predetermined settings of the rods.

However, because in practice the pallets vary substantially in thickness, and because the height control has heretofore been regulated in relation to the pallet supporting frame by rods affixed to the latter, it is apparent that differences in thickness of the successively fed pallets will result in substantial variations in height of the blocks formed by this prior control system.

Accordingly, it is a primary object of this invention to provide an improved block height control system which will overcome the shortcomings of prior art machines, and wherein novel electrically controlled, mechanical height control means are embodied to produce molded blocks of predetermined uniform height, irrespective of variations in pallet thickness.

Another object of this invention is to provide improved block height control means embodying initially yieldable mechanical height stop assemblies which are subsequently locked into non-yieldable fixed relation by electrically controlled sensing means.

A further object is to provide an improved height control means according to the preceding objectives which is relatively inexpensive to manufacture, durable and reliable in operation, and which is readily adaptable to block molding machines of the prior art with a minimum of revision or addition to said machines.

These and other objects and advantages of the invention will appear more fully upon consideration of the following detailed description taken in conjunction with the accompanying drawings. In this connection, although only one specific embodiment of the inventive concept is described and illustrated herein, it is to be expressly understood that the drawings are illustrative only and are not to be construed as representative of the full scope of the invention as it is defined in the appended claims.

Referring now to the drawings, wherein like reference characters designate like parts throughout the several figures.

Figure 1:
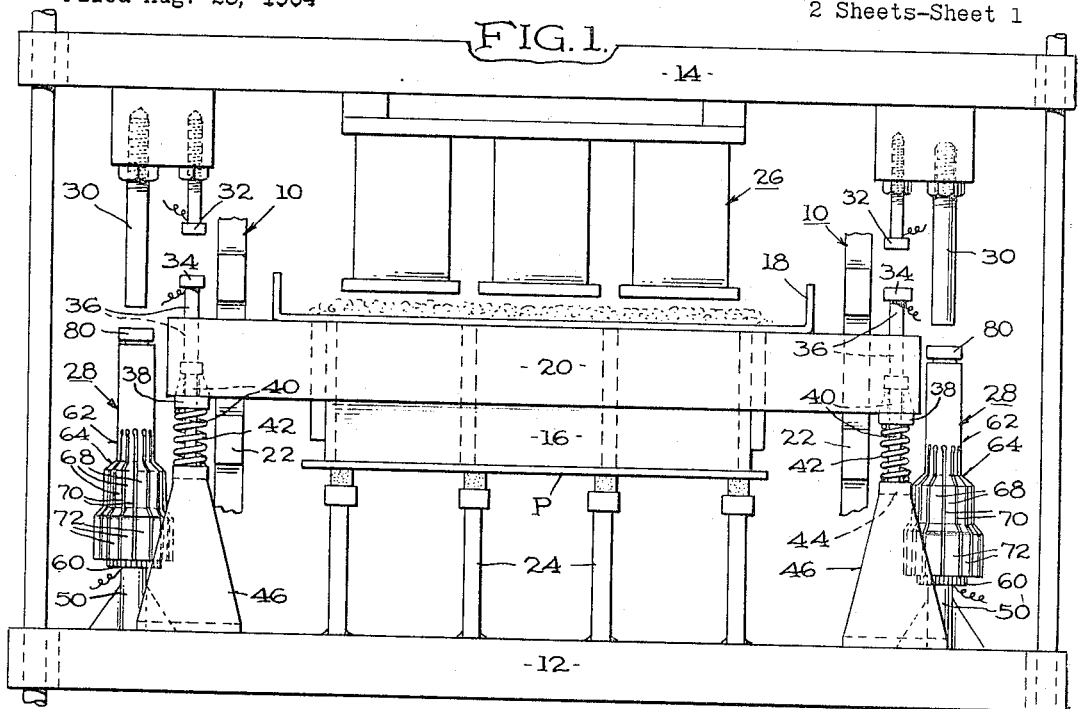
FIG. 1 is a somewhat diagrammatic front elevational view of a block forming machine embodying the invention showing certain major components, to which my improved height control means is applied, in their relative positions during the block-forming operation.
Figure 2:
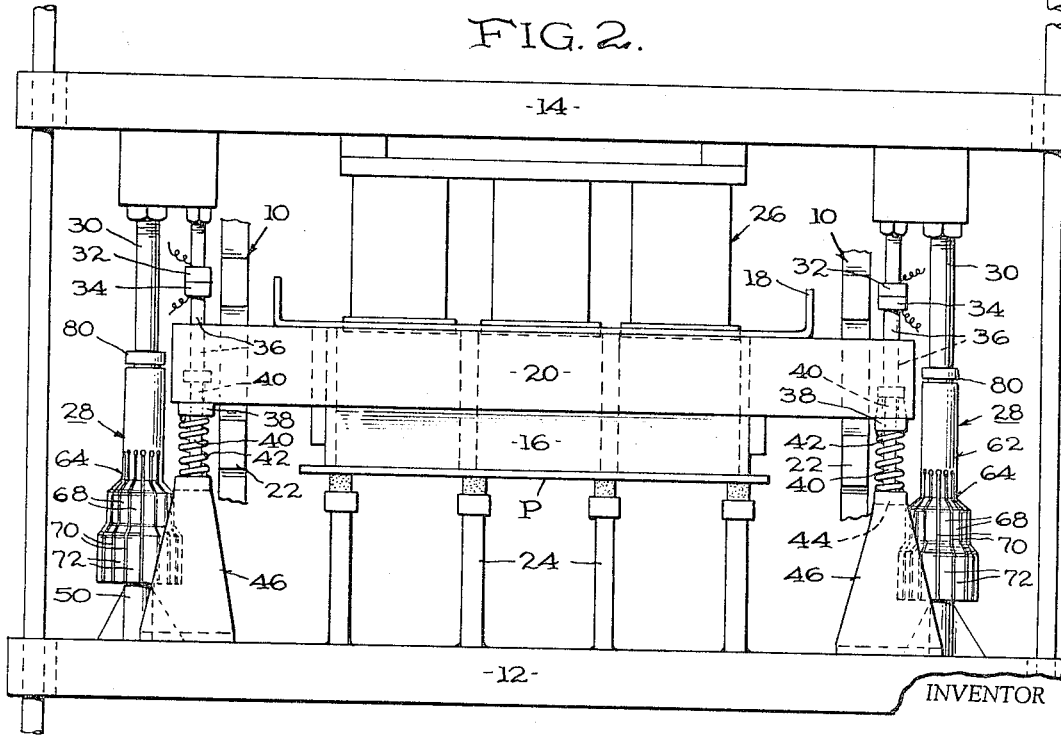
FIG. 2 is a view similar to FIG. 1, but showing the relative positions of the components during operation of the height control mechanism.

Referring first to FIGS. 1 and 2, there are shown diagrammatically therein the principal elements of a block forming machine, including a fragmentary portion of the mold box supporting and main vertical framework 10, a pallet supporting frame 12 and a stripper head supporting frame 14, both of the latter being generally horizontally disposed. A mold box 16, having a laterally projecting tray portion 18 at its upper side, is normally supported through said tray by a pair of transversely extending mold bars 20, the latter, in turn, being normally supported on a pair of arms 22 projecting forwardly from the main framework 10. However, in FIG. 1, the bars 20 and mold box 16 are shown in slightly elevated positions above the arms 22, having been raised to those positions by a plurality of anvil bars 24 carried by and extending upwardly from the pallet supporting frame 12, the bars 24 being adapted to engage and position the pallet P as required during the molding and vibrating operations.

The stripper frame 14 has attached thereto a plurality of depending stripper heads and shoes, designated generally at 26, the lower ends of which are adapted to engage and compress the aggregate mix during the molding operation, and to apply stripping pressure to the upper surfaces of the formed blocks during the stripping operation, in the conventional manner. It is to be understood that both the pallet supporting frame 12 and the stripper head supporting frame 14 are vertically movable relative to the main frame 10 and to each other.

It will also be understood that the block molding machine to which the invention relates includes suitable vibrating means for settling the mix and a suitable conveyor system for successively moving empty pallets into association with the pallet supporting frame 12 and anvil bars 24, as well as an appropriate feed box which is movable from a rearward charge-receiving position beneath a hopper to a forward charge-depositing position in registry with the mold box 16, none of which are shown herein but are disclosed in my aforementioned Patent No. 2,686,950. The feed box, stripper heads 26 and pallet supporting frame 12 and bars 24 are movable in timed relation by known means so that, after the mold box 16 is filled by the feed box, the stripper heads are moved downwardly to first compress and subsequently eject or strip the molded blocks from the mold box, while at the same time the pallet supporting frame is moved downwardly to carry the blocks away from the mold box.

In accordance with the present invention, a mechanical-electrical connection is provided between the two frames 12 and 14 which permits relative vertical movement therebetween during the block forming operation, but automatically fixes the two frames in their predetermined spaced relation achieved at the completion of the block forming operation.

In the illustrative example shown in the drawings, there is provided at each side of, and preferably affixed to, the frame 12 an upstanding yieldable height control assembly 28 which is electrically controlled in the manner described hereinafter. The stripper head supporting frame 14 also carries a pair of depending, manually adjustable control rods 30, 30 disposed in vertical alignment with assemblies 28, 28. The members 28 and 30, unlike their counterparts 28′ and 30′ in the prior art structure of FIG. 3, briefly described hereinafter, are mounted for predeterminable limited movement relative to the frames 12 and 14, and to each other.

Figure 3:
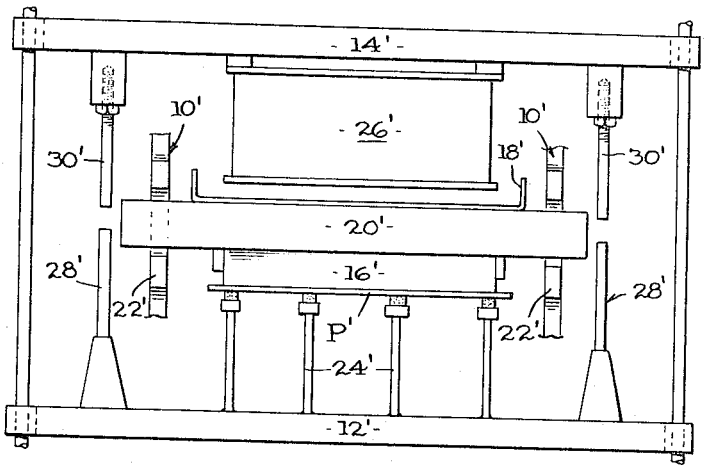
FIG. 3 is a diagrammatic front elevational view, on a reduced scale, of a block forming machine showing the height control means of the prior art.

Referring momentarily to the prior art device of FIG. 3, in which counterparts of the basic machine embodying the present invention have been designated by the same, but primed, reference numerals, the height control means therein includes rods 28′ and 30′ of which the rods 30′ are adjustably presettable in spaced relation to fixed upright rods 28′ according to the desired height of block, rods 28′ being rigidly attached to the pallet supporting frame 12′. During the block forming operation, the stop rods 28′ and 30′ will come together and determine the height of the blocks. However, with this prior art arrangement, substantial height variations may occur due to variations in thickness of successive pallets, particularly when used or worn pallets are mixed with new ones in the feed cycle. For example, when the stops are set up to produce blocks of a predetermined height as intended to be made on new or relatively new pallets, which initially have a thickness of approximately 5/16″, the blocks actually produced will have a substantially uniform height only as long as the pallets are of substantially the same thickness.

Because pallets represent a very substantial investment in the block making business, costing approximately $5 each on the present market, block manufacturers cannot afford to discard the older and worn pallets which commence to rust and scale off, sometimes reducing in thickness to 1/8″. Accordingly, these older worn and thinner pallets eventually become intermixed with the newer ones, resulting in block height variations corresponding to the differences in pallet thickness which often may be as much as 1/8″ to 3/16″, because the prior art height control stops remain in their preset positions, and because the height control therein is determined in relation to the pallet supporting frame. However, variations in block height of this magnitude are not acceptable under present day building practices which require that the blocks have a height variation or tolerance of not more than 1/16″.

Referring now to my improved height control means, a pair of electrical contacts 32 and 34 are provided for use in conjunction with each control assembly 28 and rod 30, said contacts being disposed in vertically spaced alignment and preferably carried by the movable stripper head frame 14 and the pallet supporting frame 12, respectively. The contacts 32, 32, like rods 30, 30, are provided with threaded shanks and lock nuts to enable initial manual adjustment according to predetermined settings required for the particular size block being made. However, once set and locked in place, these contacts are rigid and non-yieldable during the block molding operation, maintaining a fixed relationship with respect to the shoe bottoms of stripper head assembly 26.

Figures 4, 5:
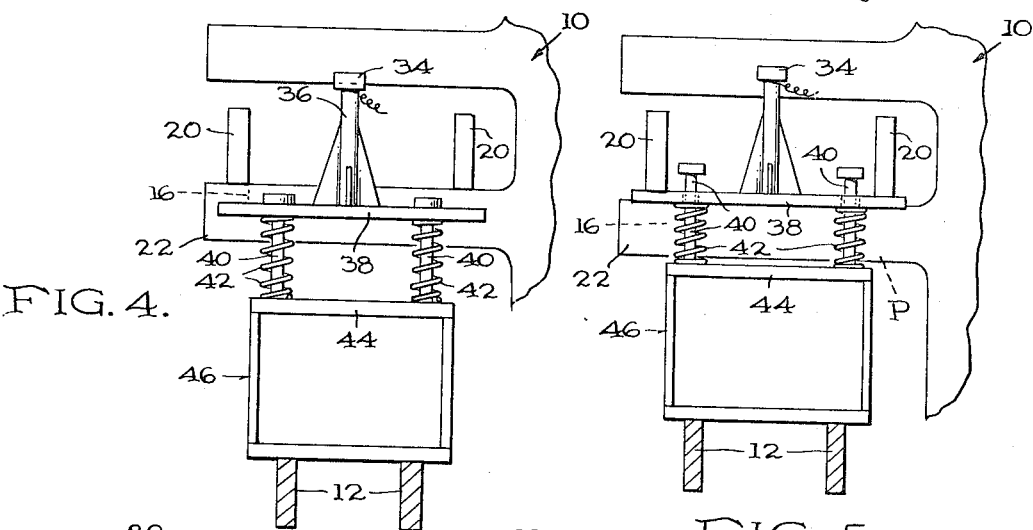
FIGS. 4 and 5 are fragmentary side elevational views of a portion of the improved control mechanism of the invention in the lowered and raised positions, respectively, of the mold box supporting bars.

Contacts 34, 34 are mounted on vertical members 36, 36 which project upwardly a predetermined distance above a pair of transverse horizontal bars 38, 38. As shown best in FIGS. 4 and 5, each of bars 38, 38 is mounted for vertical movement on a pair of spaced anvil-headed rods 40, 40, and is yieldably urged upwardly by a compression spring 42 around each rod 40 between said bar 38 and the shoulder bar 44 of a mounting frame 46 which is rigidly attached to the pallet supporting frame 12. When the frame 12 is in its lowermost position, indicated in FIG. 4, the vertical distance between the upper surfaces of bars 38 and the bottom surfaces of mold bars 20 is less than the distance between the upper surface of an unworn pallet P resting on the anvil bars 24 and the bottom of the mold box 16. Accordingly, when the pallet frame is raised to move the pallet upwardly toward the mold box, the bars 38 engage the mold bars 20 before the pallet comes into engagement with the bottom of the mold box. The springs 42 then yield to permit continued upward movement of the frame 12 relative to bars 38, but at the same time strongly urge said bars against the mold bars, until the pallet engages the bottom of the mold box and lifts it and the mold bars off the arms 22 preparatory to the vibratory settling and compacting of the aggregate mix. Also, very importantly, the contacts 34, 34 thereby become so positioned that, in cooperation with the mechanical and electrical height control components hereinafter described in detail, the distance of said contacts above the bottoms of the mold bars determined the height of the finished masonry blocks, irrespective of the thickness of the pallet P.

It is to be expressly understood that, since the mold bar 20 are fixed to and form part of the mold box 16, the distance or positioning of contacts 34 thereabove always remains the same for a given size block, as does the spaced relationship between fixed contacts 32 and the shoes of the stripper head assembly 26 and frame 14. Further, the springs 42 serve to maintain the contacts 34 in their predetermined position relative to the mold bars 20 during movement of the mold box to its near-suspended position prior to commencing of the vibration, as well as during the vibrating operation. The springs 42 are designed to be of a strength that will preclude any accidental downward movement of contacts 34 upon their engagement with the respective opposed fixed contacts 32 during operation. The resulting closure of the electrical circuit and consequent locking of the control assemblies 28 further preclude such movement.

Figures 6, 7:
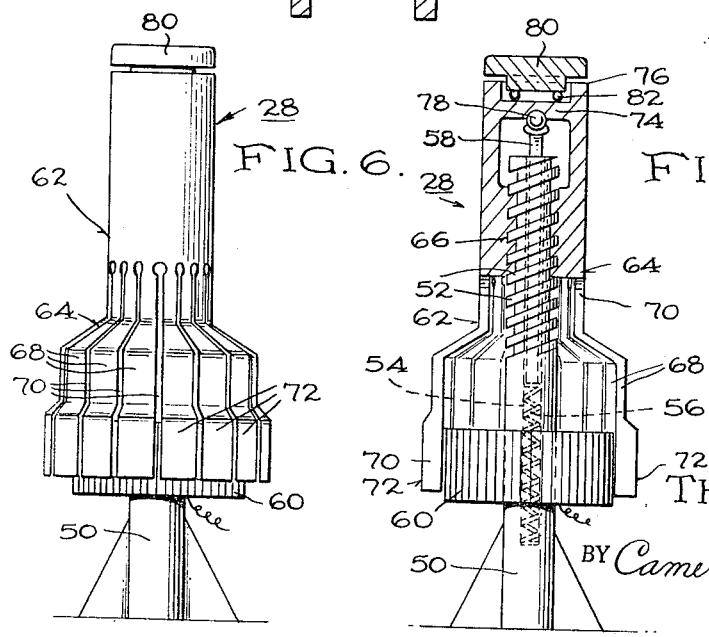
FIG. 6 is an enlarged elevational view of one of the height control assemblies shown in FIGS. 1 and 2.
FIG. 7 is a vertical cross-sectional view of the assembly of FIG. 6 with certain parts shown in full.

Referring in more detail to the yieldable mechanical control assemblies 28 (see FIGS. 6 and 7), each assembly includes a vertical standard 50 having its lower end affixed to frame 12 and its upper end provided with a square cut, helically threaded portion 52. An elongated axial bore or recess 54 extends downwardly from the upper end a substantial distance into said standard, and is provided with a spring 56 in the lower portion thereof which yieldably supports a vertically shiftable positioning rod 58 the upper end of which projects beyond the end of bore 54. An electromagnet assembly 60, of generally cylindrical form and having a vertically serrated annular periphery, is affixed to the standard 50 intermediate the base thereof and the threaded portion 52.

A rotatable sleeve member 62 surrounds the upper portion of standard 50 and is provided with a cylindrical body portion 64 having an internally threaded bore 66 cooperating with the externally threaded portion 52 of standard 50. The body 64 also includes a plurality of circumferentially spaced, semi-flexible, depending skirt-like fingers 68 defined by slots 70, said fingers being provided with complementally serrated finger tips 72 of magnetic material adapted to engage the serrated periphery of the electromagnet 60 when the latter is energized by engagement of contacts 34 with contacts 32. The upper portion of sleeve member 62 is preferably of annular formation and is provided with a horizontal bearing wall 74 adjacent, but below, the upper end 76 of the sleeve member. A suitable ball bearing 78 is disposed in complementally formed seats provided in the bottom surface of bearing wall 74 and the upper end of rod 58, respectively, and enables sleeve member 62 to rotate more easily with respect to the threaded portion 52 of standard 50. A disc-like bearing plate 80 is rotatably supported on the upper surface of bearing wall 74 by means of suitable bearings 82 designed to further reduce friction and to enhance the rotatability of sleeve member 62 in response to downward movement by control rod 30 during the block forming operation. By making the top bearing surface of member 62 a separate piece or plate 80, it is apparent that the latter is readily replaceable after it has become worn as a result of long term operational service.

The spring-loaded rod 58 serves to exert continual pressure between the complementally threaded members 62 and 50, and unscrews sleeve member 62 upwardly on standard 50 to reposition the latter upon disengagement with control rod 30, thereby readying the control mechanism 28 for the next cycle of operation.

Assuming that the rod-supported electrical contacts 32, 32 and height control rods 30, 30 have been preadjusted to proper levels relative to the cooperating contacts 34, 34 and control assemblies 28, 28, respectively, at the beginning of the molding operation, and that the vibrating mechanism (not shown) is in operation to effect settling of the mix in the mold box, the operational sequence is as follows.

As the vibration continues, the stripper frame 14 carrying the rods 30 and contacts 32 moves downwardly to bring the stripper heads and shoes 26 into compacting engagement with the aggregate mix in the mold box 16. Inasmuch as the spacing between the lower ends of rods 30 and bearing plates 80 of the mechanical height control assemblies 28 is initially less than the spacing between the electrical contacts 32 and 34 (see FIG. 1), the ends of rods 30 come into engagement with plates 80 before the contacts 32 and 34 close to energize electromagnets 60, with the result that continued downward movement of frame 14 forces the sleeve members 62 rotatably downward on the threaded standards 50 against the yieldable resistance of springs 56. This downward movement of rods 30 and the cooperating sleeve members 62 of assemblies 28 is instantaneously arrested when the simultaneously downwardly moving contacts 32 make electrical contact with their cooperating contacts 34, at which time an appropriately wired relay mechanism (not shown) instantaneously energizes the electromagnets 60 on standards 50 so as to pull the serrated finger tips 72 into locking engagement with the serrated periphery of the magnets. It is apparent that this action immediately establishes a positively locked or fixed mechanical interconnection between the stripper frame 14 and the pallet frame 12. When the aforesaid electrical contact is effected, the vibrating mechanism is also simultaneously shut down preparatory to the stripping operation, at which time the shoes of the stripper head mechanism have compacted the mix and have been lowered into the open top mold box (see FIG. 2) to a position which establishes the desired height of the finished blocks according to the predetermined setting of the control rods and contacts.

Continued operation of the machine in the conventional manner produces the required relative movements of the various components which effect the stripping operation. During this operation, downward movement of the stripper frame 14 causes stripper heads 26 to pass downwardly through the mold box 16 and eject the blocks, and also moves the pallet P, with the newly formed blocks thereon, downwardly at the same speed, due to the now fixed interconnection of frames 12 and 14.

When the pallet P reaches its lowermost position, downward movement of frames 12 and 14 is stopped and the loaded pallet is advanced to an appropriate removal station by means well known in the art. As the loaded pallet is moved forwardly after the stripping operation, conventional conveyor components automatically bring another empty pallet into position, whereupon frame 12 and anvil bars 24 raise it into correct position beneath the mold box. During this same portion of the cycle of the machine, the frame 14 and stripper head mechanism 26 are also moved upwardly and returned to their initial positions preparatory to a repetition of the operating cycle.

It is evident from the foregoing disclosure that the objects and advantages of the invention as set forth in the preamble have been achieved, and that there is thus provided a novel and improved height control system for accurately producing molded blocks of predetermined uniform height which is unaffected by the varying thickness of intermixed worn and unworn pallets. It is to be understood that the height limitation of the blocks is established in relation to the mold box and mold box supporting bars rather than in relation to the pallet and pallet supporting frame. A novel combination of mechanical and electrical means has been illustrated and described for insuring a positive mechanical connection between the stripper head supporting frame and the pallet supporting frame when the predetermined height of the blocks has been established, which means embodies cooperating fixed and yieldable mechanical elements on the respective frames which permit limited relative movement of the two frames during the block forming operation. The same means is also operative to maintain the frames in the spaced relationship achieved at the instant the molded blocks are completed so that they become fixed as a unit and can move as a unit relative to the mold box during the stripping operation without any possibility of crushing or fracturing the newly formed blocks.

While one specific installation has been described and illustrated herein, it is to be expressly understood that the invention is not limited to the exact structure shown in the drawings, and that various changes and mechanical modifications, which will become apparent to those skilled in the art, may be made without departing from the invention concept as defined in the appended claims.

I claim:

1. In combination with a masonry block molding machine of the type including a vibratable mold box open at the top and bottom and adapted to receive a block forming aggregate mix, a vertically movable pallet supporting frame adapted to lift and hold a pallet against the bottom of said mold box and to also support said mold box during the block molding operation, and a stripper head frame having a depending stripper head and shoe assembly movable downwardly relative to the mold box and to the pallet supporting frame to initially compact the aggregate mix in said mold box to a predetermined level and to subsequently eject the molded blocks from the mold;

a block height control system operable independently of variations in pallet thickness comprising:
(a) mechanical control means carried by said stripper head frame and said pallet supporting frame, respectively, in normally spaced-apart relationship and adapted to come into engagement with one another during approaching relative movement of said frames;
(b) the mechanical control means carried by one of said frames including a control rod projecting from said one frame toward the other frame and adapted for initial adjustment relative to the mechanical control means carried by said other frame;
(c) the mechanical control means carried by one of said frames being adapted for yieldable movement relative to said one frame upon initial engagement with the mechanical control means carried by the other frame as said frames approach one another;
(d) the mechanical control means carried by said other frame including a control assembly disposed in vertical alignment with said control rod and embodying a vertically elongated standard fixed to said other frame, and a sleeve member coaxially mounted on said standard and adapted for axial movement relative thereto upon initial engagement with said control rod as said frames approach one another;
(e) electrically actuated means operable after said initial engagement for preventing further axial movement of said sleeve member; and
(f) electrical control means for actuating said electrically actuated means including electrical contacts carried by said stripper head frame and said pallet supporting frame, respectively, in normally spaced-apart relationship, and adapted to make contact with one another when said stripper head frame reaches a predetermined position relative to said mold box during the approaching movement of said frames.

2. A height control system for masonry block molding machines as defined in claim 1, wherein said control assembly is further characterized by:
(a) complemental threads formed on portions of said standard and said sleeve member enabling said sleeve member to move both rotatably and axially relative to said standard;
(b) an electromagnet carried by said standard in spaced relation to said threads adapted to be energized by said electrical control means; and
(c) a plurality of semi-resilient fingers of magnetic material fixed to said sleeve member and annularly disposed about said electromagnet, said fingers being adapted to grip a portion of said standard and prevent further rotational and axial movement of said sleeve member relative to said standard upon energization of said electromagnet.

3. In combination with a masonry block molding machine of the type including a vibratable mold box open at the top and bottom and adapted to receive a block forming aggregate mix, a vertically movable pallet supporting frame adapted to lift and hold a pallet against the bottom of said mold box and to also support said mold box during the block molding operation, and a stripper head frame having a depending stripper head and shoe assembly movable downwardly relative to the mold box and to the pallet supporting frame to initially compact the aggregate mix in said mold box to a predetermined level and to subsequently eject the molded blocks from the mold;

a block height control system operable independently of variations in pallet thickness comprising:
(a) a control rod projecting downwardly from said stripper head frame toward said pallet supporting frame;
(b) a control assembly carried by said pallet supporting frame in normally spaced vertical alignment with said control rod including a pair of coaxially mounted members one of which is fixed to said pallet supporting frame and the other is a sleeve member yieldably movable relative to said fixed member upon initial engagement with said control rod during approaching relative movement of said frames;
(c) an electromagnet carried by said fixed member and operable after said initial engagement for preventing further yieldable movement of said sleeve member; and
(d) electrical control means for energizing said electromagnet including electrical contacts carried by said frame in normally spaced-apart relationship and adapted to make contact with one another when said stripper head frame reaches a predetermined position relative to said mold box during the approaching movement of said frames.

4. A height control system for masonry block molding machines as defined in claim 3, wherein:
(a) said control rod is initially adjustable relative to said control assembly;
(b) said coaxially mounted fixed and sleeve members have complemental threads formed on portions thereof to enable said sleeve member to move both rotatably and axially relative to said fixed member; and
(c) said sleeve member includes a plurality of semi-resilient fingers of magnetic material fixed thereto and annularly disposed about said electromagnet, said fingers being adapted to grip a portion of said fixed member and prevent further rotational and axial movement of said sleeve member upon energization of said electromagnet.

5. A height control system for masonry block molding machines as defined in claim 4, wherein:
(a) the electrical contact carried by said pallet supporting frame is mounted for yieldable movement relative to said frame;
(b) yieldable spring means are provided for maintaining said contact in a fixed position relative to said mold box during upward movement of said pallet supporting frame after said frame has reached the position wherein the mold box is supported by said frame; and
(c) the electrical contact carried by said stripper head frame is normally fixed relative thereto in vertical alignment with said first-mentioned contact, but is initially adjustable relative to said stripper head frame so as to provide a predetermined height of block.

References Cited by the Examiner

UNITED STATES PATENTS 2,985,935   5/1961   Wellnitz _____ 25—41

J. SPENCER OVERHOLSER, *Primary Examiner.*

E. MAR, *Assistant Examiner.*